(12) United States Patent
Hwang

(10) Patent No.: US 6,564,565 B2
(45) Date of Patent: May 20, 2003

(54) AIR CONDITIONING SYSTEM AND METHOD

(75) Inventor: Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/984,049

(22) Filed: Oct. 26, 2001

(65) Prior Publication Data

US 2002/0139133 A1 Oct. 3, 2002

(30) Foreign Application Priority Data

Feb. 26, 2001 (KR) .......................................... 2001-9746

(51) Int. Cl.7 ............................ F25B 41/00; F25B 41/04
(52) U.S. Cl. .......................................... 62/210; 62/222
(58) Field of Search .......................... 62/222, 210, 212, 62/196.2, 225

(56) References Cited

U.S. PATENT DOCUMENTS

| 4,193,270 A | * | 3/1980 | Scott ............................. 62/175 |
| 4,848,099 A | * | 7/1989 | Beckey et al. ................. 62/212 |
| 5,050,397 A | * | 9/1991 | Sugiyma et al. .............. 62/175 |
| 5,709,094 A | * | 1/1998 | Ooyabu et al. ............... 62/126 |
| 5,749,238 A | * | 5/1998 | Schmidt ........................ 62/211 |
| 5,771,703 A | * | 6/1998 | Rejendran .................... 62/204 |
| 5,867,998 A | * | 2/1999 | Guertin ......................... 62/225 |

* cited by examiner

*Primary Examiner*—Denise L. Esquivel
*Assistant Examiner*—Marc Norman
(74) *Attorney, Agent, or Firm*—Birch, Stewart, Kolasch & Birch, LLP

(57) ABSTRACT

Disclosed is an air conditioning system and method employing at least two compressors so as to improve the refrigeration efficiency, in which expansion of a refrigerant in an expansion section is controlled according to a used state of the compressors depending on a refrigeration load, so that a general performance of the system can be improved. In the air conditioning system and method, measurement of the changes in the flowing quantity and the pressure of the refrigerant, which is necessary in order to control the opening state of the expansion section, can be executed by sensing and comparing the temperatures at the outlet port of the evaporation section and at the inlet port of the compression section, which show a temperature difference according to the flowing quantity and the pressure of the refrigerant. Therefore, the air conditioning system and method of the present invention achieves a simple construction, which can be easily assembled and enables the manufacturing cost to be reduced.

22 Claims, 4 Drawing Sheets

AIR CONDITIONING SYSTEM AND METHOD

BACKGROUND OF THE INVENTION

1. Field of the Invention

The present invention relates to a system and method for air conditioning by utilizing a phenomenon of evaporation, and more particularly to an air conditioning system and an air conditioning method employing at least two compressors so as to improve the refrigeration efficiency, in which expansion of a refrigerant in an expansion section is controlled according to a used state of the compressors depending on a refrigeration load, so that a general performance of the system can be improved.

2. Description of the Related Art

Main components of an air conditioner are a compressor, an evaporator, an expansion valve and a condenser. Of these main components, the air conditioner has recently shown an increasing tendency to employ a plurality of compressors in order to increase the refrigerating effect. Nowadays, the air conditioner usually employs an air conditioning method utilizing two compressors, since an air conditioner employing more than two compressors has been proved to be disadvantageous in the aspect of the performance ratio to the production ratio.

FIG. 1 is a schematic systematic view of a conventional air conditioning system employing two compressors.

Referring to FIG. 1, the conventional air conditioning system employing two compressors includes a compression section 10 for compressing a gas refrigerant of low temperature and low pressure into a gas refrigerant of high temperature and high pressure by means of two compressors, a condensing section 20 for cooling the gas refrigerant of high temperature and high pressure produced in the compression section 10 into a liquid refrigerant of intermediate temperature and high pressure, an expansion section 30 for depressurizing the liquid refrigerant of intermediate temperature and high pressure produced in the condensing section 20 into a liquid refrigerant of low temperature and low pressure, and an evaporation section 40, in which the liquid refrigerant of low temperature and low pressure produced in the expansion section 30 absorbs heat from its surroundings to be transformed into a gas refrigerant of low temperature and low pressure.

In more detailed description, the compression section 10 is a section, which not only sucks and compresses a gas refrigerant of low temperature and low pressure to make the gas refrigerant transformed into a state, in which it can be liquefied even at a relatively high temperature, but also provides a circulating force for the refrigerant. In this section, it is recently an increasing inclination that two compressors are utilized in order to improve the compression efficiency.

Further, the condensing section 20 is a section, in which the gas refrigerant of high temperature and high pressure produced in the compression section 10 is cooled and liquefied by means of the exterior air applied to the condenser by a fan. In this section, the gas refrigerant of high temperature and high pressure is transformed into the liquid refrigerant of intermediate temperature and high pressure while passing through the condensing section 20.

Moreover, the expansion section 30 is a section, in which the liquid refrigerant of intermediate temperature and high pressure produced in the condensing section 20 is transformed into the liquid refrigerant of low temperature and low pressure mainly by means of the expansion valve.

Further, the evaporation section 40 is a section, in which the liquid refrigerant of low temperature and low pressure produced in the expansion section 30 absorbs heat from its surroundings to be gasified while passing through the evaporator. The surrounding air cooled in this section as described above is sent to an indoor space by a rotation of a fan.

In the air conditioning system utilizing two conventional compressors having the construction as described above, the same expansion section is used as that in the air conditioning system employing one compressor. In this case, this expansion section generally consists of an expansion valve, which is a capillary tube. Consequently, in the air conditioning system employing two compressors, the two compressors may not rapidly cope with the pressure and the flowing quantity of the refrigerant changing according to the operation state of the two compressors, so that the refrigerant can be inversely flown into the compressors again. Further, the temperature of the refrigerant introduced into the compressors through the evaporation section can be increased due to a great change in the flowing quantity of the refrigerant to thereby increase the internal pressure of the compressors, which disturbs a stable operation of the system.

In other words, the conventional expansion valve applies such a large load to the air conditioning system employing two compressors, so as to disturb a smooth operation of the compression section, thereby deteriorating the general function of the system.

SUMMARY OF THE INVENTION

Accordingly, the present invention has been made in an effort to solve the problems occurring in the related art, and it is an object of the present invention to provide an air conditioning system and an air conditioning method, in which an expansion section can be flexibly operated according to the operation state of at least two compressors, so that the compressors can smoothly operate, to thereby improve the general performance of the system.

In accordance with one aspect, the present invention provides an air conditioning system comprising: a compression section employing at least two compressors, which transform a gas refrigerant of low temperature and low pressure into a gas refrigerant of high temperature and high pressure and enable an operation capacity of the compression section to be changed according to a refrigeration load; a condensing section for transforming the gas refrigerant of high temperature and high pressure, which has been compressed in the compression section, into a liquid refrigerant of intermediate temperature and high pressure; an expansion section employing an electronic expansion valve, which properly expands the liquid refrigerant of intermediate temperature and high pressure, which has been produced in the condensing section, to be transformed into a liquid refrigerant of low temperature and low pressure; an evaporation section for transforming the liquid refrigerant of low temperature and low pressure produced in the expansion section into a gas refrigerant of low temperature and low pressure; temperature sensors respectively disposed at an inlet port of the compression section and an outlet port of the evaporation section to sense temperatures; and a control section for controlling the electronic expansion valve according to a result after dealing with sensed temperatures inputted from the temperature sensors.

In accordance with another aspect, the present invention provides an air conditioning method by an air conditioning system including a compression section and an evaporation section, the method comprising: a temperature difference measuring step, in which temperatures are measured by temperature sensors respectively disposed at an inlet port of IC the compression section and at an outlet port of the evaporation section, so as to estimate a degree of superheat, which is a value obtained by subtracting a first temperature at the outlet port of the evaporation section from a second temperature at the inlet port of the compression section; a superheated degree comparison step, in which an estimated degree of superheat estimated in the temperature difference measuring step is compared with a target degree of superheat; and a superheated degree compensation step, in which a difference of superheated degrees is compensated when the estimated degree of superheat is different from the target degree of superheat as a result of a comparison in the superheated degree comparison step.

In the air conditioning system and method according to the present invention, at least two compressors are employed so as to improve the refrigeration efficiency, and an opening state of an expansion section is controlled correspondingly to an operated state of the compressors, so as to reduce the negative load applied to the compressors due to the changes in the flowing quantity and the pressure of the refrigerant according to the state of the operated compressor, so that a general performance of the system can be improved.

In this case, measurement of the changes in the flowing quantity and the pressure of the refrigerant, which is necessary in order to control the opening state of the expansion section, can be executed by sensing and comparing the temperatures at the outlet port of the evaporation section and at the inlet port of the compression section, which show a temperature difference according to the flowing quantity and the pressure of the refrigerant. Therefore, the air conditioning system and method of the present invention achieves a simple construction, which can be easily assembled and enables the manufacturing cost to be reduced.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

The above and other objects, characteristics, and advantages of the present invention will be apparent from the following description along with the accompanying drawings.

Hereinafter, for a specific embodiment of an air conditioning system and method according to the present invention, given will be a description about an air conditioning system employing a compression section including two compressors.

Figure 1:
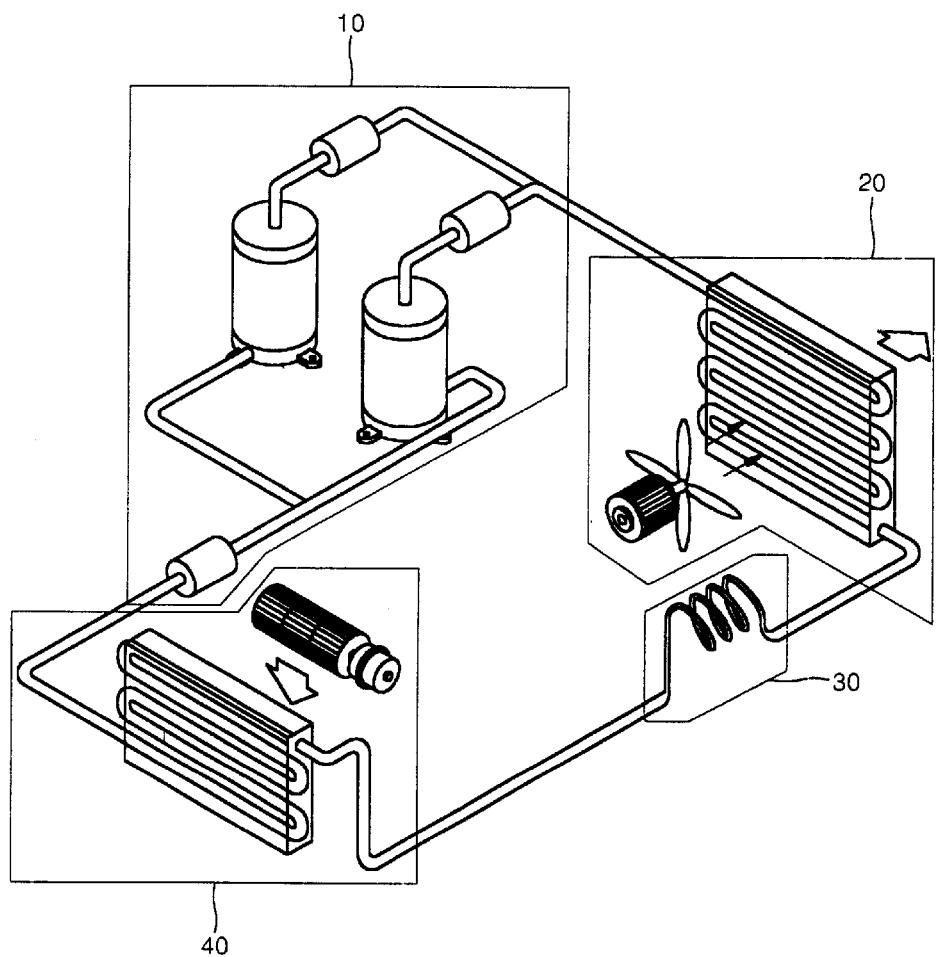
FIG. 1 is a schematic systematic view of a conventional air conditioning system employing two compressors.
Figure 2:
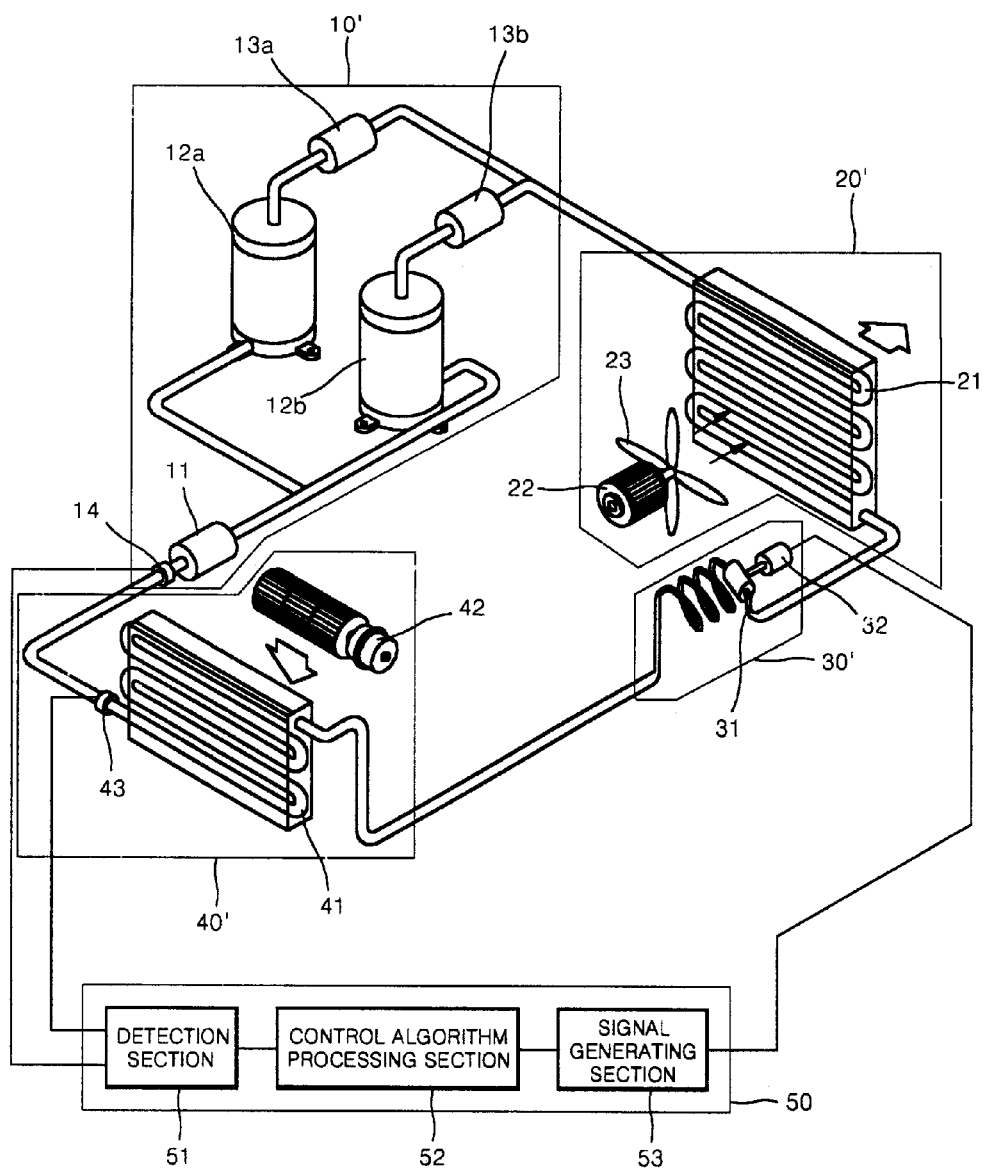
FIG. 2 is a schematic systematic view of an air conditioning system according to a preferred embodiment of the present invention.

FIG. 2 is a schematic systematic view of an air conditioning system according to a preferred embodiment of the present invention.

Referring to FIG. 2, the air conditioning system according to the present invention includes a compression section 10' employing two compressors, which transform a gas refrigerant of low temperature and low pressure into a gas refrigerant of high temperature and high pressure and enable the operation capacity of the compression section 10' to be changed according to the refrigeration load, a condensing section 20' for transforming the gas refrigerant of high temperature and high pressure, which has been compressed in the compression section 10', into a liquid refrigerant of intermediate temperature and high pressure, an expansion section 30' employing an electronic expansion valve, which properly expands the liquid refrigerant of intermediate temperature and high pressure produced in the condensing section 20' to be transformed into a liquid refrigerant of low temperature and low pressure, an evaporation section 40' for transforming the liquid refrigerant of low temperature and low pressure produced in the expansion section 30' into a gas refrigerant of low temperature and low pressure, temperature sensors respectively disposed at an inlet port of the compression section and an outlet port of the evaporation section to sense the temperature, and a control section 50 for controlling the electronic expansion valve of the condensing section according to the result after dealing with the sensed temperature inputted from the temperature sensors.

In more detailed description, the compression section 10' includes an accumulator 11, through which only the gas refrigerant of low temperature and low pressure produced in the evaporation section 40' can pass, two compressors 12a and 12b for compressing the gas refrigerant of low temperature and low pressure having passed through the accumulator 11, and check valves 13a and 13b disposed at exhaust ports of the compressors 12a and 12b to prevent the refrigerant from being inversely introduced into the compressors.

In this case, the accumulator 11 is an apparatus for passing only the gas refrigerant through the accumulator 11, so as to prevent a misoperation of the compressors 12a and 12b, which may be caused when a liquid refrigerant is introduced into the compressors.

In the present embodiment, two compressors 12a and 12b are employed in the air conditioning system in order to improve the efficiency according to the refrigeration load. In this case, it is preferred that the capacities of the two compressors respectively are 60% and 40% of the total capacity, and 100% means a full capacity in which both compressors are being operated.

When only one of the compressors 12a and 12b is operated, the check valves 13a and 13b prevent the refrigerant from being inversely introduced into the dormant one of the compressors, which is not operated, from the condensing section 20'.

Further, the condensing section 20' includes a condenser 21, in which the gas refrigerant of high temperature and high pressure produced in the compression section 10' is cooled to be transformed into the liquid refrigerant of intermediate temperature and high pressure, a fan 23 for supplying an outdoor air to the condenser to provide a refrigeration effect, and a fan motor 22 for driving the fan 23.

In this case, the condenser 21 is a pipe extending in a zigzag shape, and the gas refrigerant of high temperature and high pressure after passing the compression section 10' is cooled to be transformed into the liquid refrigerant of high temperature and high pressure while passing through the condenser 21.

The fan motor 22 and the fan 23 are apparatuses for supplying the outdoor air to the condenser 21 to thereby provide the refrigeration effect.

Further, the expansion section 30' employs an electronic expansion valve controlled by the control section 50 to transform the liquid refrigerant of intermediate temperature and high pressure produced in the condensing section 20' into the gas refrigerant of low temperature and low pressure. The electronic expansion valve includes an expansion valve 31, which is a capillary tube, and an expansion valve motor 32. The expansion valve 31 is opened and closed by the expansion valve motor 32. It is preferred that the expansion valve motor 32 is a stepping motor.

Further, the evaporation section 40' includes an evaporator 41, in which the liquid refrigerant of low temperature and low pressure produced in the expansion section 30' absorbs heat from the surroundings to be transformed into the gas refrigerant of low temperature and low pressure, and an indoor fan 42 disposed behind the evaporator 41 to supply the cooled surrounding air to the exterior.

Further, the temperature sensors 14 and 43 provided at the inlet port of the accumulator 11 and the outlet port of the evaporator 41 are apparatuses for sensing the temperatures of the inlet port of the accumulator 11 and the outlet port of the evaporator 41.

In this case, it is preferred that the temperature sensors 14 and 43 respectively employ a thermistor, which is a semiconductor device made by combining and sintering oxides of elements such as manganese, nickel, copper, cobalt, chrome, and iron. The thermistor has an electric resistance, which largely changes according to the temperature and is reduced when the temperature increases.

Further, the control section 50 includes a detection section 51 for detecting a sensed value from the temperature sensors 14 and 43, a control algorithm processing section 52 for processing the sensed value detected by the detection section 51, and a signal generating section 53 for generating a control signal according to a result of a process by the control algorithm processing section 52.

In the air conditioning system having the construction as described above, in order to overcome the problem of the conventional air conditioning system employing two compressors that the flowing quantity and the pressure of the refrigerant largely changes according to the state of the operated compressor to consequently disturb the operation of the compressor, the expansion section is controlled to be properly opened and closed, so that the compressor can be properly operated. In this case, it is necessary to measure changes in the flowing quantity and the pressure of the refrigerant in order to control the opening and the closing of the expansion section. This measurement can be enabled by measuring the temperature difference between the inlet port of the compression section and the outlet port of the evaporation section, which respectively change according to the changes in the flowing quantity and the pressure of the refrigerant.

That is, in the air conditioning system according to the present invention, the negative load applied to the compressor is estimated through the temperature difference between the inlet port of the compression section and the outlet port of the evaporation section, and then the expansion section is controlled in such a manner as that the temperature difference corresponding to the load can be properly maintained. In result, the negative load applied to the compressor is reduced to thereby improve the general performance of the system.

Hereinafter, an air conditioning method in the above system will be described with reference to the drawings.

Figure 3:
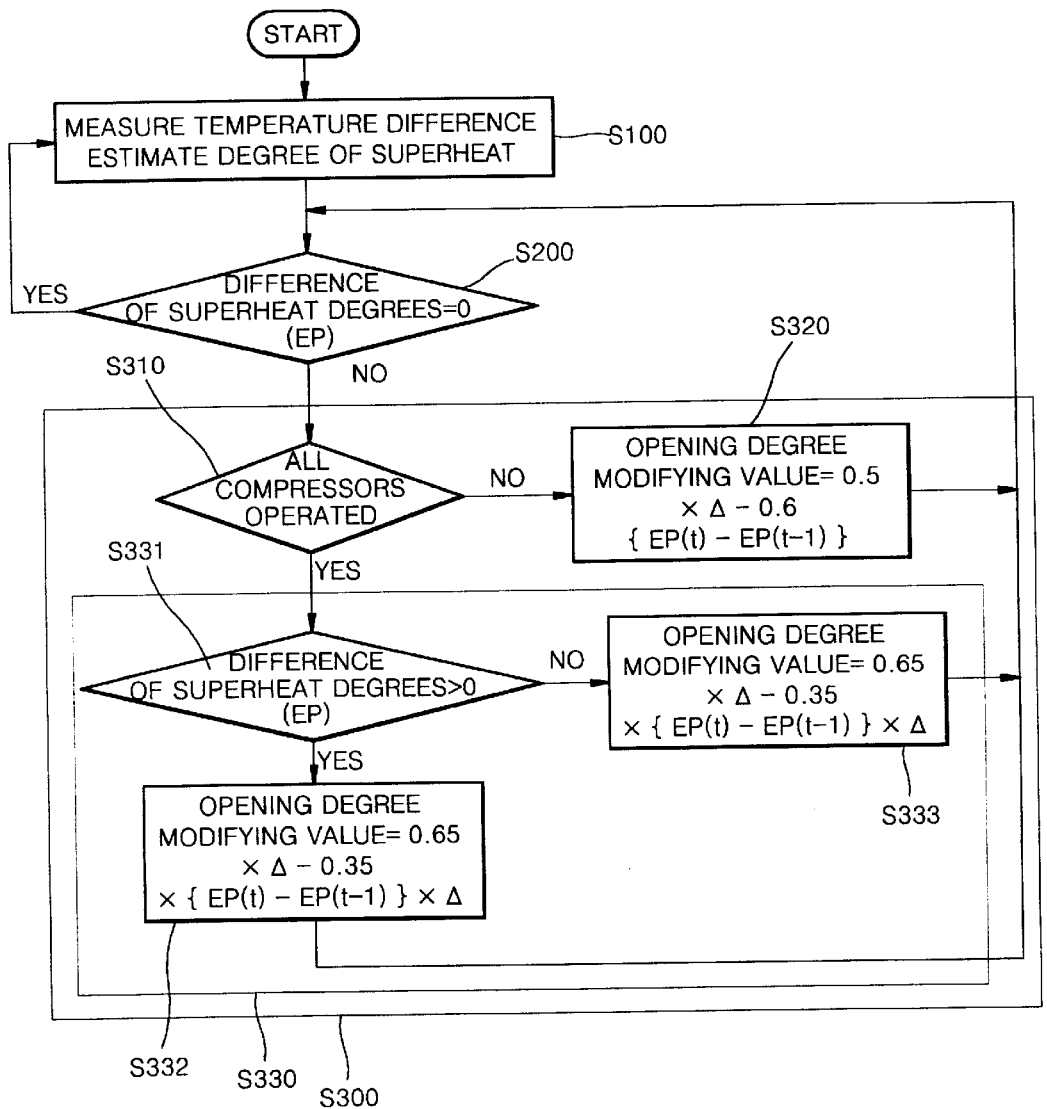
FIG. 3 is a flow chart of an air conditioning method according to a preferred embodiment of the present invention.

FIG. 3 is a flow chart of an air conditioning method according to a preferred embodiment of the present invention.

Referring to FIG. 3, the air conditioning method includes: a temperature difference measuring step (S100), in which temperatures are measured by temperature sensors respectively disposed at the inlet port of the compression section and at the outlet port of the evaporation section, so as to estimate a degree of superheat, which means a value obtained by subtracting the temperature at the outlet port of the evaporation section from the temperature at the inlet port of the compression section; a superheated degree comparison step (S200), in which the estimated degree of superheat is compared with a target degree of superheat; and a superheated degree compensation step (S300), in which a difference between the estimated degree of superheat and the target degree of superheat is compensated when the estimated degree of superheat is different from the target degree of superheat as a result of the comparison.

In more detailed description, the temperature difference measuring step (S100) is a step, in which temperatures are measured by the temperature sensors 14 and 43 respectively disposed at the inlet port of the accumulator 11 of the compression section and at the outlet port of the evaporator 41 of the evaporation section.

In general, the temperature at the inlet port of the accumulator 11 is higher than the outlet port of the evaporator 41. This temperature difference is caused by friction and pressure generated when the gas refrigerant exhausted from the evaporator 41 passes through a narrow tube at a high speed, and the temperature difference to some degree increases the temperature of the liquid refrigerant, which is not gasified but remains even after passing through the evaporator 41, in some degree, to thereby enable the refrigerant exhausted from the evaporator 41 to be introduced into the accumulator 11 in a more complete gas state.

However, when the temperature difference is too large, the temperature in the compressors 12a and 12b is further increased to make the pressure in the compressors be increased and the compressors be overloaded. On the other hand, when the temperature difference is too small, some of the refrigerant, which is not gasified but maintained in the liquid state even after passing through the evaporator 41, may flow into the compressors to cause a misoperation of the compressors. Of course, although the accumulator 11 filters off most of the liquid refrigerant, this filtering is not completely reliable.

Therefore, due to the reasons as described above, the system can be stably operated when the temperature difference between the inlet port of the accumulator 11 and the outlet port of the evaporator 41 is properly determined and maintained. In other words, the changes in the flowing quantity and the pressure of the refrigerant can be decreased when the temperature difference between the two locations is properly maintained.

In the following description, the degree of superheat is defined as a value obtained by subtracting the temperature at the outlet of the evaporation section, or the evaporators, from the temperature of the inlet port of the compression section, or the accumulator.

Further, the target degree of superheat is defined as an aimed value of the degree of superheat, and a difference of superheated degrees is defined as a value obtained by subtracting the target degree of superheat from the estimated degree of superheat.

Meanwhile, superheated degree comparison step (S200) is a step, in which the estimated degree of superheat is compared with the target degree of superheat, and the compared result is the difference of superheated degrees.

It is preferred that the target degree of superheat is between five and seven at the normal temperature regardless of the capacities such as 100%, 60%, and 40%. Meanwhile, it is also preferred that the target degree of superheat is between two and four(0° C.) regardless of the capacities when the outdoor temperature is higher than 40° C. The reason why the target degree of superheat is lower at the temperature over 40° C. as described above is to prevent the pressure applied to the compression section from further increasing due to the high outdoor temperature even when the degree of superheat is between five and seven(°C.). Of course, the lowered target degree of superheat has a negative effect, because the refrigerant, which is exhausted from the evaporation section and flows into the compression section, is not completely gasified but contains liquid refrigerant in some extent due to the low degree of superheat. However, this negative effect is insignificant in comparison with the effect by the increase of pressure due to the increase of temperature.

Further, in general, the degree of superheat is relatively larger when only one compressor is used, in comparison with the case where two compressors are used. This is because, when only one compressor is used, the refrigerant passes only through the single channel to the single operated compressor. Therefore, when only one compressor is used, although the degree of superheat is elevated to increase the pressure applied to the compression section, it does not matter because the total flowing quantity of the refrigerant is relatively small.

The superheated degree compensation step (S300) is a step, in which compensation is carried out when the difference of superheated degrees is not zero, that is, when the estimated degree of superheat is different from the target degree of superheat. The superheated degree compensation step (S300) includes: an operated compressor detecting step (S310), in which the number of operated compressors is judged; a first superheated degree compensation step (S320), in which, as a result of the judgment, an opening degree modifying value in the case where only one compressor is operated is estimated, so as to compensate an entire opening degree; and a second superheated degree compensation step (S330), in which, as a result of the judgment, an opening degree modifying value in the case where both of the two compressors are operated is estimated, so as to compensate an entire opening degree.

In this case, the entire opening degree is a value for indicating a degree by which the expansion valve is opened. That is, the value zero means a state in which the expansion valve is completely closed, and the expansion valve is opened more widely as the value increases.

In the first superheated degree compensation step (S320), when the capacities of the two compressors respectively are 60% and 40% of the total capacity, 100% of which means a capacity when both of the two compressors are operated, the opening degree modifying value is estimated by the following equation 1.

$$\Delta LEV=0.5\times\Delta+0.6\times\{Ep(t)-Ep(t-1)\} \quad \text{EQUATION 1}$$

In Equation 1, $\Delta LEV$, $\Delta$, $Ep(t)$, and $Ep(t-1)$ respectively mean an opening degree modifying value, an opening degree variance, a difference of superheated degrees in the present stage, and a difference of superheated degrees in the previous stage.

The following table 1 shows values of the opening degree variance $\Delta$ in various cases, which have been obtained through experiments.

TABLE 1

| Difference of superheated degrees (Ep) (° C.) | Opening degree variance $\Delta$ | |
|---|---|---|
| | 100% | 60% & 40% |
| 4 < Ep | 5 | 3 |
| 3 < Ep ≦ 4 | 4 | 2 |
| 2 < Ep ≦ 3 | 3 | 1 |
| 1 < Ep ≦ 2 | 2 | 1 |
| 0.5 < Ep ≦ 1 | 1 | 0 |
| −0.5 < Ep ≦ 0.5 | 0 | 0 |
| −1 < Ep ≦ −0.5 | −1 | 0 |
| −2 < Ep ≦ −1 | −2 | −1 |
| −3 < Ep ≦ −2 | −3 | −1 |
| −4 < Ep ≦ −3 | −4 | −2 |
| −7 < Ep ≦ −4 | −5 | −3 |
| Ep ≦ −7 | −15 | −10 |

That is, when only one of the two compressors is operated, an opening degree modifying value estimated by the above equation 1 is added to the previous entire opening degree, so that the entire opening degree is changed.

The second superheated degree compensation step (S330), which is executed when both of the two compressors are operated, includes: a superheated degree examination step (S331), in which the difference of superheated degrees is compared with zero; a third superheated degree compensation step (S332), in which, as a result of the examination, an opening degree modifying value in the case where the difference of superheated degrees is larger than zero is estimated; and a fourth superheated degree compensation step (S333), in which, as a result of the examination, an opening degree modifying value in the case where the difference of superheated degrees is smaller than zero is estimated. In this case, the opening degree modifying value estimated in the third superheated degree compensation step (S332) is determined by the following equation 2.

$$\Delta LEV=0.65\times\Delta+0.35\times\{Ep(t)-Ep(t-1)\}\times\Delta \quad \text{EQUATION 2}$$

In Equation 2, $\Delta LEV$, $\Delta$, $Ep(t)$, and $Ep(t-1)$ respectively mean an opening degree modifying value, an opening degree variance, a difference of superheated degrees in the present stage, and a difference of superheated degrees in the previous stage.

The opening degree variance $\Delta$ is the same as shown in the table 1.

Further, the opening degree modifying value estimated in the fourth superheated degree compensation step (S333) is determined by the following equation 3.

$$\Delta LEV=0.65\times\Delta-0.35\times\{Ep(t)-Ep(t-1)\}\times\Delta \quad \text{EQUATION 3}$$

In Equation 3, $\Delta LEV$, $\Delta$, $Ep(t)$, and $Ep(t-1)$ respectively mean an opening degree modifying value, an opening degree variance, a difference of superheated degrees in the present stage, and a difference of superheated degrees in the previous stage.

The opening degree variance $\Delta$ is the same as shown in the table 1.

That is, when both of the two compressors are operated, an opening degree modifying value estimated by equation 2 or equation 3 as described above is added to the previous entire opening degree, so that the entire opening degree is changed.

According to the present invention, as described above, the entire opening degree is changed by means of the opening degree modifying value estimated by equation 1, equation 2, or equation 3, so that the expansion section can be controlled, and consequently the input temperature of the compression section and the output temperature of the evaporation section influenced by the expansion section can be controlled.

In this case, it is preferred that the entire opening degree compensated by the opening degree modifying value is in a range between 100 and 300 which is non-dimensional number, on condition that a completely closed state is zero and the opening degree increases as the numeral increases.

Meanwhile, in the temperature difference measuring step in the control as described above, it is preferred that the time of sensing the temperature is not longer than thirty seconds each time and the time interval in sensing the temperature in the entire control is not longer than thirty seconds. Further, in consideration of the fact that the system is stably operated after five minutes from the starting of the system, it is also preferred that the time of sensing the temperature is not longer than sixty seconds each time and the time interval in sensing the temperature in the entire control is not longer than sixty seconds after five minutes from the starting of the system.

Figure 4:
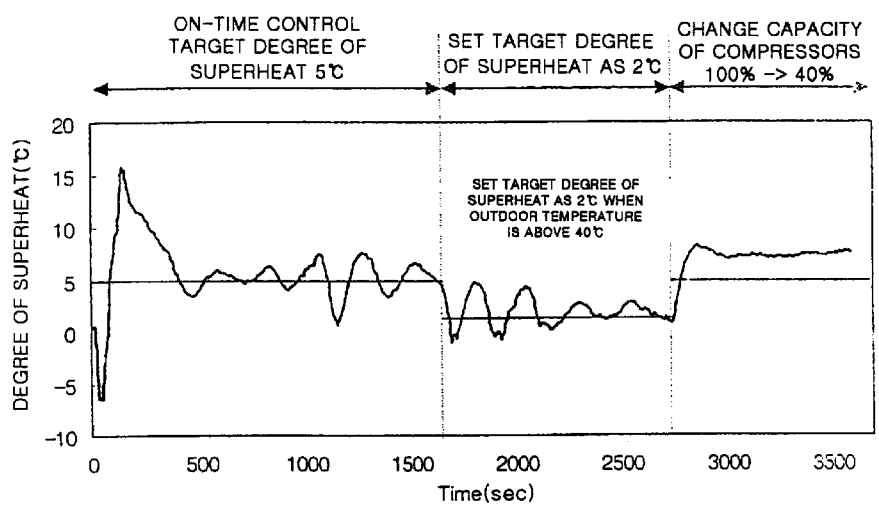
FIG. 4 is a graph for showing a change of the degree of superheat in an air conditioning system and method according to the present invention.

FIG. 4 is a graph for showing a change of the degree of superheat in an air conditioning system and method according to the present invention.

Referring to FIG. 4, which shows the states at the normal temperature and at a temperature not lower than 40° C. when both of the two compressors are operated, it is noticed that the degree of superheat is maintained about five(°C.) at the normal temperature and about two(°C.) when the outdoor temperature is not lower than 40° C.

Further, when only one compressor is operated, the degree of superheat is maintained between five and seven, that is, in the range of the target degree of superheat, which is higher than five (° C.), the degree of superheat when the two compressors are operated.

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention. Especially, according to the present invention, a compression section including at least two compressors can be employed in all kinds of air conditioners.

What is claimed is:

1. An air conditioning system comprising:
   a compression section employing at least two compressors and an accumulator, wherein said at least two compressors transform a gas refrigerant of low temperature and low pressure into a gas refrigerant of high temperature and high pressure and enable an operation capacity of the compression section to be changed according to a refrigeration load;
   a condensing section for transforming the gas refrigerant of high temperature and high pressure, which has been compressed in the compression section, into a liquid refrigerant of intermediate temperature and high pressure;
   an expansion section employing an electronic expansion valve, which properly expands the liquid refrigerant of intermediate temperature and high pressure, which has been produced in the condensing section, to be transformed into a liquid refrigerant of low temperature and low pressure;
   an evaporation section having an evaporator for transforming the liquid refrigerant of low temperature and low pressure produced in the expansion section into a gas refrigerant of low temperature and low pressure;
   temperature sensors being provided at an inlet port of said accumulator of the compression section and at an outlet port of said evaporator of the evaporation section; and
   a control section for controlling the electronic expansion valve according to a result after dealing with sensed temperatures inputted from the temperature sensors.

2. An air conditioning system as claimed in claim 1, wherein the compression section comprises:
   said accumulator, through which only the gas refrigerant of low temperature and low pressure produced in the evaporation section can pass;
   two compressors for compressing the gas refrigerant of low temperature and low pressure having passed through the accumulator; and
   check valves disposed at exhaust ports of the compressors to prevent the refrigerant from being inversely introduced into the compressors.

3. An air conditioning system as claimed in claim 1, wherein the compression section comprises at least two compressors whose compression capacities are equal to or different from each other, so that the compression section can have a large compression capacity.

4. An air conditioning system as claimed in claim 1, wherein the condensing section comprises:
   a condenser, in which the gas refrigerant of high temperature and high pressure produced in the compression section is cooled to be transformed into the liquid refrigerant of intermediate temperature and high pressure;
   a fan for supplying an outdoor air to the condenser to provide a refrigeration effect; and
   a fan motor for driving the fan.

5. An air conditioning system as claimed in claim 1, further comprising a stepping motor for determining an opening and a closing of the electronic expansion valve.

6. An air conditioning system as claimed in claim 1, wherein the evaporation section comprises:
   said evaporator, in which the liquid refrigerant of low temperature and low pressure produced in the expansion section absorbs heat from surroundings to be transformed into the gas refrigerant of low temperature and low pressure; and
   an indoor fan disposed behind the evaporator to supply a cooled surrounding air to an exterior.

7. An air conditioning system as claimed in claim 1, wherein each of the temperature sensors is a thermistor.

8. An air conditioning system as claimed in claim 1, wherein the control section comprises:
   a detection section for detecting a sensed value from the temperature sensors;
   a control algorithm processing section for processing the sensed value detected by the detection section; and
   a signal generating section for generating a control signal according to a result of a process by the control algorithm processing section.

9. An air conditioning system comprising:
   a compression section employing at least two compressors which transform a gas refrigerant of low temperature and low pressure into a gas refrigerant of high temperature and high pressure and enable an operation capacity of the compression section to be changed according to a refrigeration load, wherein the compression section comprises two compressors and capacities of the two compressors are respectively 60% and 40% of a total capacity, 100% of which means a full capacity when both of the two compressors are operated;

a condensing section for transforming the gas refrigerant of high temperature and high pressure, which has been compressed in the compression section, into a liquid refrigerant of intermediate temperature and high pressure;

an expansion section employing an electronic expansion valve, which properly expands the liquid refrigerant of intermediate temperature and high pressure, which has been produced in the condensing section, to be transformed into a liquid refrigerant of low temperature and low pressure;

an evaporation section having an evaporator for transforming the liquid refrigerant of low temperature and low pressure produced in the expansion section into a gas refrigerant of low temperature and low pressure;

temperature sensors being respectively disposed at an inlet port of the compression section and an outlet port of the evaporation section to sense temperatures; and a control section for controlling the electronic expansion valve according to a result after dealing with sensed temperatures inputted from the temperature sensors.

10. An air conditioning method by an air conditioning system including a compression section and an evaporation section, the method comprising:

a temperature difference measuring step, in which temperatures are measured by temperature sensors respectively disposed at an inlet port of the compression section and at an outlet port of the evaporation section, so as to estimate a degree of superheat, which is a value obtained by subtracting a first temperature at the outlet port of the evaporation section from a second temperature at the inlet port of the compression section;

a superheated degree comparison step, in which an estimated degree of superheat estimated in the temperature difference measuring step is compared with a target degree of superheat; and a superheated degree compensation step, in which a difference of superheated degrees is compensated when the estimated degree of superheat is different from the target degree of superheat as a result of a comparison in the superheated degree comparison step.

11. An air conditioning system as claimed in claim 10, wherein the temperature sensors are provided at an inlet port of an accumulator of the compression section and at an outlet port of an evaporator of the evaporation section.

12. An air conditioning method as claimed in claim 10, wherein the target degree of superheat has a value between five and seven degrees Celsius.

13. An air conditioning method as claimed in claim 12, wherein the predetermined temperature is not higher than 40° C.

14. An air conditioning method as claimed in claim 10, wherein the target degree of superheat has a value between two and four degrees Celsius when an outdoor temperature is not lower than a predetermined temperature, which has an effect on a pressure of the compression section.

15. An air conditioning method as claimed in claim 10, wherein, in the temperature difference measuring step, the temperatures are measured at time intervals of not longer than thirty seconds.

16. An air conditioning method as claimed in claim 10, wherein, in the temperature difference measuring step, the temperatures are measured at time intervals of not longer than one minute after five minutes from a starting of the air conditioning system.

17. An air conditioning method by an air conditioning system including a compression section and an evaporation section, the method comprising:

a temperature difference measuring step, in which temperatures are measured by temperature sensors respectively disposed at an inlet port of the compression section and at an outlet port of the evaporation section, so as to estimate a degree of superheat, which is a value obtained by subtracting a first temperature at the outlet port of the evaporation section from a second temperature at the inlet port of the compression section;

a superheated degree comparison step, in which an estimated degree of superheat estimated in the temperature difference measuring step is compared with a target degree of superheat; and a superheated degree compensation step, in which a difference of superheated degrees is compensated when the estimated degree of superheat is different from the target degree of superheat as a result of a comparison in the superheated degree comparison step, wherein the superheated degree compensation step comprises:

an operated compressor detecting step, in which how many compressors are operated is judged;

a first superheated degree compensation step, in which, as a result of a judgment in the operated compressor detecting step, an opening degree modifying value when only one compressor is operated is estimated, so as to compensate an entire opening degree; and a second superheated degree compensation step, in which, as a result of a judgment in the operated compressor detecting step, an opening degree modifying value when both of two compressors in the compression section are operated is estimated, so as to compensate the entire opening degree.

18. An air conditioning method as claimed in claim 17, wherein the entire opening degree has a value between 100 and 300 when a completely closed state has a value of zero.

19. An air conditioning method as claimed in claim 17, wherein, when capacities of the two compressors respectively are 60% and 40% of a total capacity. 100% of which is a capacity when both of the two compressors are operated, the opening degree of expansion valve modifying value is estimated by a first equation, $\Delta LEV=0.5\times\Delta+0.6\times\{Ep(t)-Ep(t-1)\}$, in which $\Delta LEV$, $\Delta$, $Ep(t)$, and $Ep(t-1)$ are respectively an opening degree modifying value, an opening degree variance, a difference of superheated degrees in a present stage, and a difference of superheated degrees in a previous stage.

20. An air conditioning method as claimed in claim 17, wherein the second superheated degree compensation step comprises:

a superheated degree examination step, in which the difference of superheated degrees is compared with zero;

a third superheated degree compensation step, in which, as a result of an examination in the superheated degree examination step, an opening degree modifying value when the difference of superheated degrees is larger than zero is estimated; and a fourth superheated degree compensation step, in which, as a result of an examination in the superheated degree examination step, an opening degree modifying value when the difference of superheated degrees is smaller than zero is estimated.

21. An air conditioning method as claimed in claim 20, wherein the opening degree of expansion valve modifying value estimated in the third superheated degree compensation step is determined by a second equation, $\Delta LEV = 0.65 \times \Delta + 0.35 \times \{Ep(t) - Ep(t-1)\} \times \Delta$, in which $\Delta LEV$, $\Delta$, $Ep(t)$, and $Ep(t-1)$ are respectively an opening degree modifying value, an opening degree variance, a difference of superheated degrees in a present stage, and a difference of superheated degrees in a previous stage.

22. An air conditioning method as claimed in claim 20, wherein the opening degree modifying value estimated in the fourth superheated degree compensation step is determined by a third equation, $\Delta LEV = 0.65 \times \Delta - 0.35 \times \{Ep(t) - Ep(t-1)\} \times \Delta$, in which $\Delta LEV$, $\Delta$, $Ep(t)$, and $Ep(t-1)$ are respectively an opening degree modifying value, an opening degree variance, a difference of superheated degrees in a present stage, and a difference of superheated degrees in a previous stage.

* * * * *